July 5, 1949.   G. F. DALY   2,475,312
ACCUMULATOR ENTRY MEANS CONTROLLED
BY COMBINATIONAL HOLE RECORDS
Filed May 15, 1945   8 Sheets-Sheet 1

INVENTOR
G. F. DALY
BY
W. M. Wilson
ATTORNEY

July 5, 1949.

G. F. DALY 2,475,312

ACCUMULATOR ENTRY MEANS CONTROLLED
BY COMBINATIONAL HOLE RECORDS

Filed May 15, 1945

INVENTOR
G. F. DALY
BY
ATTORNEY

July 5, 1949.  G. F. DALY  2,475,312
ACCUMULATOR ENTRY MEANS CONTROLLED
BY COMBINATIONAL HOLE RECORDS
Filed May 15, 1945   8 Sheets-Sheet 4
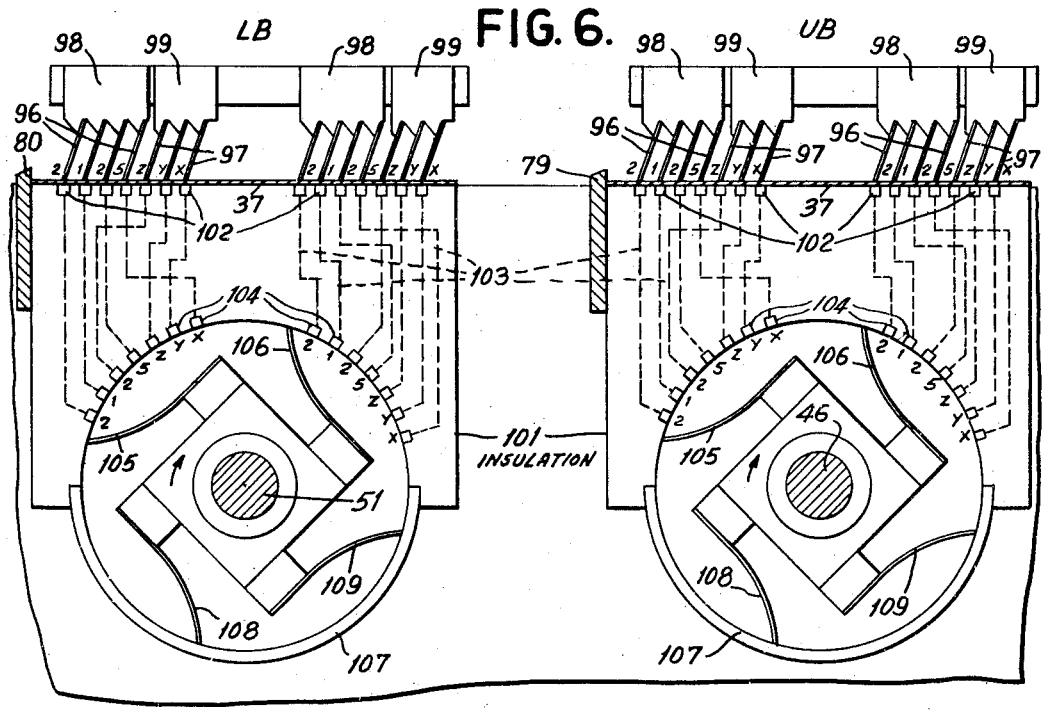
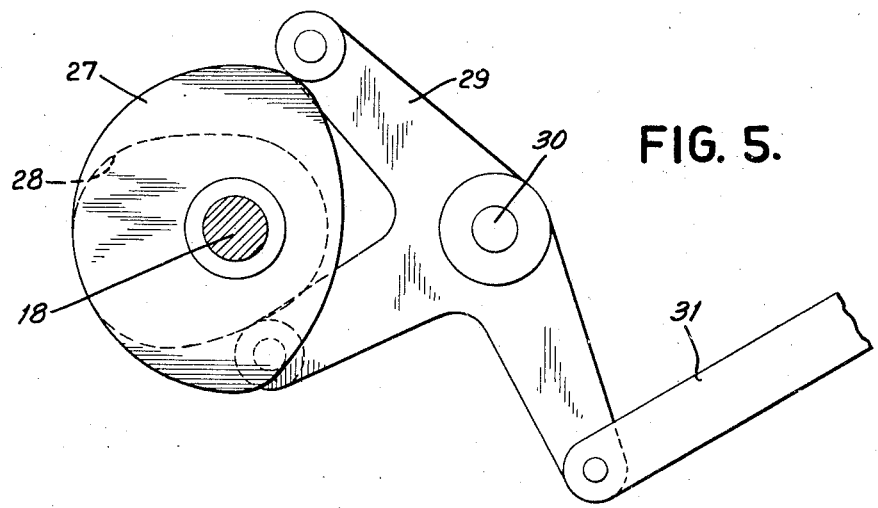
INVENTOR
G. F. DALY
BY
ATTORNEY

INVENTOR
G. F. DALY
BY
ATTORNEY

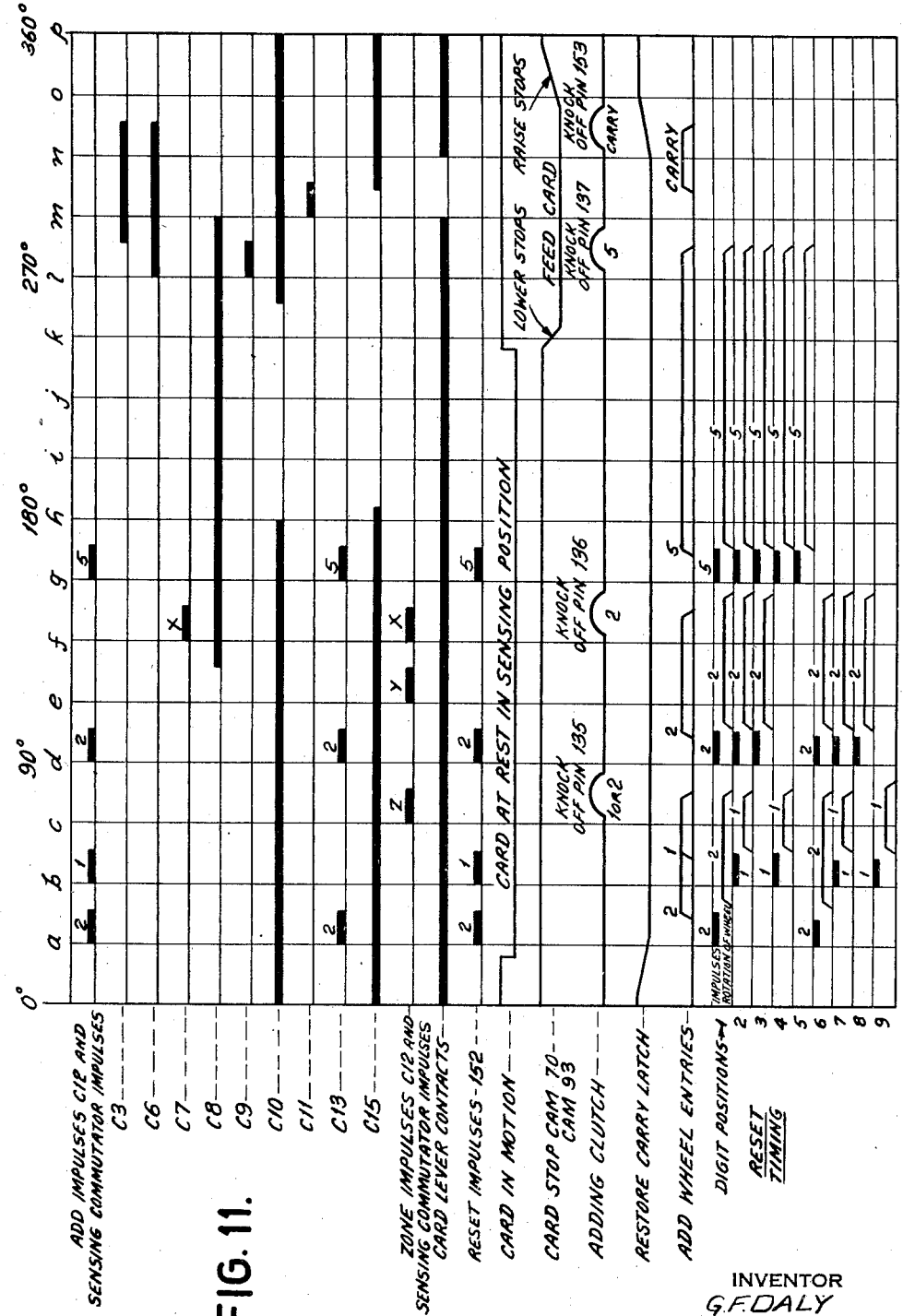

Patented July 5, 1949

2,475,312

UNITED STATES PATENT OFFICE 2,475,312

ACCUMULATOR ENTRY MEANS CONTROLLED BY COMBINATIONAL HOLE RECORDS

George F. Daly, Endicott, N. Y., assignor to International Business Machines Corporation, New York, N. Y., a corporation of New York Application May 15, 1945, Serial No. 593,857

4 Claims. (Cl. 235—61.6)

This invention relates to record controlled accounting machines and more particularly to improvements in the additive and substractive digit entering and resetting mechanisms for accumulators.

The present improvement was devised primarily to provide a practical and simplified form of entering mechanism for an accumulator operable according to the decimal notation system, under control of a record perforated according to an arbitrary code which is selected to fit in the scheme of operation.

The prior art is replete with various forms of entering mechanisms for accumulators operable according to the decimal notation system in which the control means therefor, such as a card, keys, etc. is indexed in the same system. The indexing of the card in the decimal notation system, best exemplified as the Hollerith card, presents many advantages but one corresponding disadvantage namely is the large area occupied by the perforations in the denominational columns. Cards perforated according to a combinational hole system surmount this objection but have required prior to this invention complicated code translators, converters, and the like to effect accumulator operation according to the decimal notation system.

It is, therefore, the main object of the present invention to provide a novel digit entering means under control of coded designations which is simple in construction and embodiment, practical in construction and operation and which possesses many features which renders coded designations useful and practical for high-speed operation of card controlled accounting machines.

Another object of the invention is the provision of a digit entry mechanism of improved construction operable during varying periods which provides for the selective entry of digits in an accumulator, which digits entered alone or in predetermined combinations effect entries according to the decimal notation system.

A still further object of the invention is to select such digit entries under control of card perforations arranged according to an arbitrary code, and which are assigned digital values according to an established system.

In carrying out the fundamental and basic features of the invention, the digits of the system which are selected are arbitrary but conform to the requirement that the digits alone or in combinations will effect all of the digit entries required in the decimal notation system. In the decimal system there are many combinations of digits such as 1, 2, 2, 4; 1, 1, 2, 5; 1, 2, 4, 6 and 2, 1, 2, 5 herein employed for the purpose of illustration. Proper selection of digits reduce the number of perforations located in a card column, thus requiring less than nine perforations which have been previously used in the Hollerith type of card to express the digits 1-9, inclusive in the decimal system. Accordingly, the proper selection of the assigned values to the perforations used, singly or in combination, reduces the card area perforated to express and represent numbers. With this understanding, it is obvious that the perforations do not represent digits by virtue of their differential locations as in the Hollerith type of card, but by the arbitrary values of the digits assigned to them, and function by proper correlation with the entering mechanism to selectively determine the appropriate entries in the accumulator.

A still further object of the invention is to correlate the plurality of perforation sensing means of each order with a commutator which initiates the digit entries to provide what is known herein as a "sensing commutator." This specific construction provides an arrangement which is simple in construction and operation and efficient in its function.

The accumulator preferably employed in connection with the present invention is of a type well known in the art wherein the initiation of a digit entering operation is effected by transmission of a start impulse to an electromagnet which couples the accumulator element to a driving shaft and wherein the additive entry operation for the accumulator element is preferably terminated by mechanically uncoupling the accumulator element from the driving shaft by "knock-off pins." The accumulator also has a stop magnet which functions like the knock-off pins, but such stop magnet is utilized, as will later appear, in subtracting operations. In carrying out the present invention for additive operations the cyclically operable impulse transmitting means or commutator for the start magnet has spaced contact points which potentially transmit impulses at differential times in the entering cycle of operation. The knock-off pins are also spaced so as to be effective after the transmission of each start impulse to mechanically uncouple the accumulator element to terminate the digit entering operations. By suitably spacing the timing of transmission of start impulses and the operation of the knock-off pins, digit entering periods of various durations are provided which effect the entry of the desired digit in the accumulator element. Multiple wire connections between the contact points of the commutator and the related plurality of perforation sensing brushes enables differentially timed impulses to be transmitted to the start magnet whenever a brush senses a perforation at the index point position with which it is correlated. Hence, such wiring provides a novel correlation between the sensing brushes and the commutator to enable the initiation of digit entering periods of durations which are selected by the perforations to cause the entry of digits in the accumulator equivalent to the assigned digital values of the perforations. The above form of embodiment carries out one of the objects of the invention by a construction distinguished by its simplicity and effectiveness in operation.

A still further object of the invention is to enable the accumulator to operate in a subtractive manner to enter the nines complements of the digits represented by the perforations in the accumulator when subtracting operations are to be selectively effected. When subtraction is to be performed, impulses are transmitted by an impulse emitter to the start magnets of all orders during the subtracting entering cycle to normally enter the digits 2, 2, 5, or 9 in each order. Also in subtraction the sensing commutator is correlated with the stop magnet of the related order so that upon sensing a perforation the designated normal digit entry is cancelled or nullified. The provision of this subtraction scheme augments the usefulness of the present additive entering arrangement without detracting from the feature of simplicity in construction and effectiveness in operation.

Another object of the invention is to provide for resetting the accumulator by entering in each order the digits 2, 1, 2, 5 singly or in combination according to the digit representation of the accumulator which will bring the wheels to zero. In carrying out this novel arrangement a reset emitter transmits differentially timed impulses which are selected by the readout device of each order according to its initial and advanced digit positions to ultimately bring the accumulator element to zero. The present resetting arrangement also possesses the feature of simplicity in construction and efficiency in function.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 is a detail view of a cam and related operating mechanism and is taken on the line 5—5 of Fig. 2.

Fig. 6 is a sectional view showing the sensing commutators associated with the LB and UB card analyzing stations.

Figure 9:
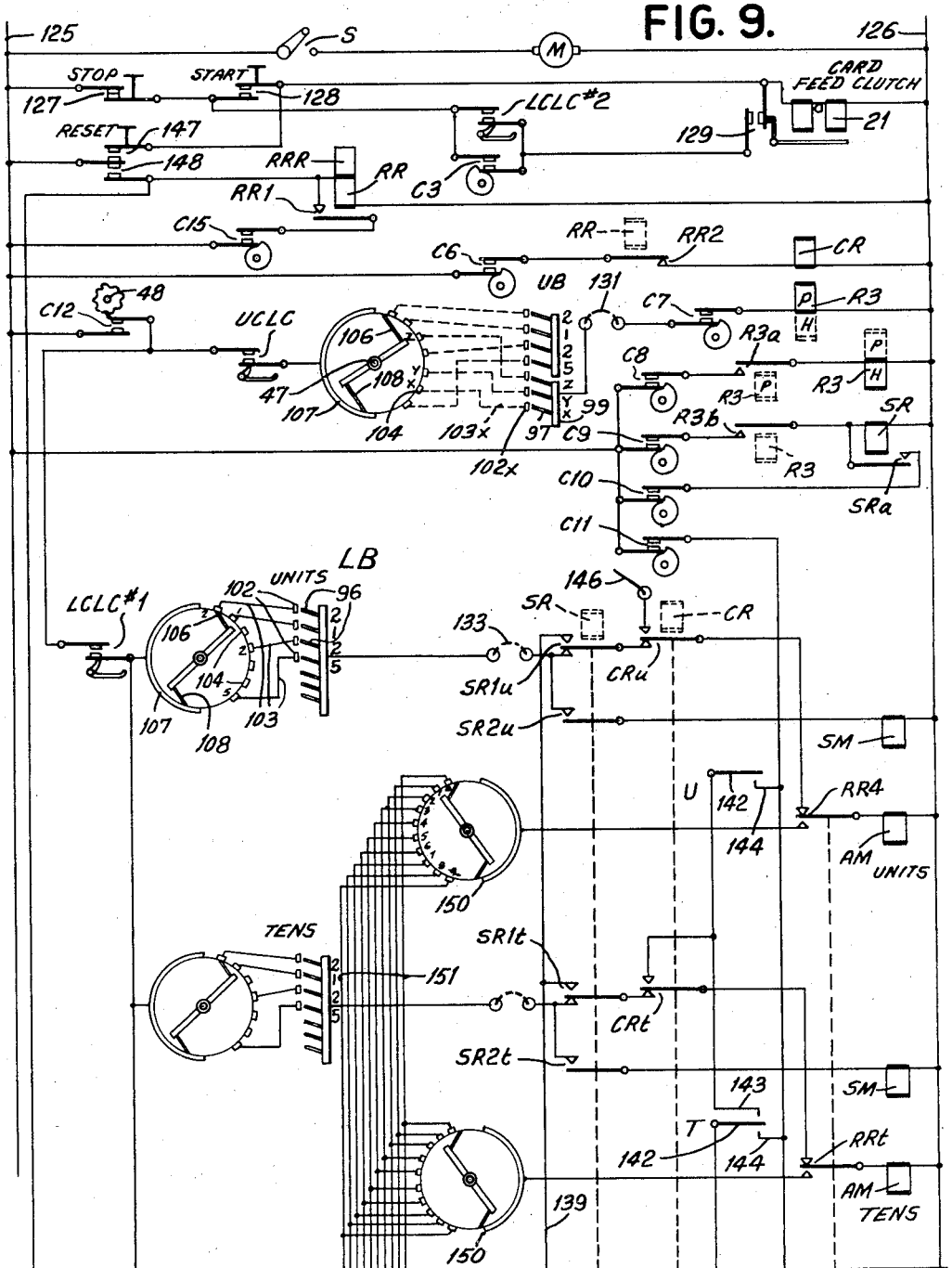
Figure 10:
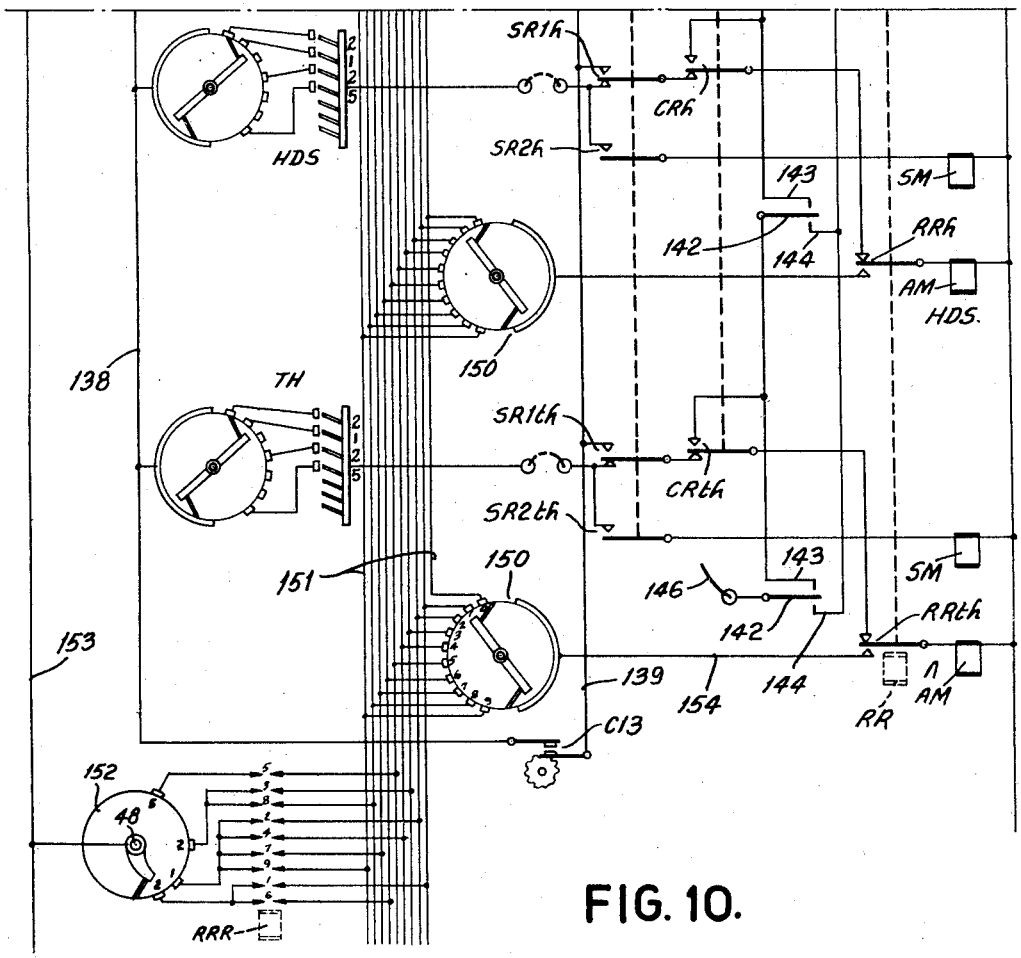

Fig. 9 and Fig. 10 when taken together with Fig. 9 on the top show the wiring diagram of the machine.

Fig. 11 is a timing diagram.

Main Drive

The motive power for the machine is obtained from a constantly operating motor, the armature shaft of which has a belt connection 10 (Figs. 1, 2) to continuously rotate a pulley 13. Attached to the hub of the pulley 13 is a clutch element 15 (see Fig. 3) in the plane of a clutch pawl 16 pivotally mounted on an arm 17 secured to the main drive shaft 18.

While the clutch element 15 constantly rotates, the clutch pawl 16 is held out of engagement with said element by means of a clutch release arm 19, said arm having an integral portion 20 which is attracted by a magnet 21. Said magnet is the customary card feed clutch magnet of the machine and, as is well known, when energized rocks the clutch release arm 19—20, enabling pawl 16 to be spring-operated to engage the clutch element 15, thereby rotating the main drive shaft 18 counterclockwise for a complete revolution. At the termination of a revolution of the main drive shaft 18 the clutch release arms 19—20 come to normal position to be in the path of a tail 22 of the clutch pawl 16, rocking the latter out of engagement with clutch element 15. On the pivot stud 23 of the clutch release arms 19—20 there is mounted a spring pressed latch plate 24. Said plate is rocked by the tail 22 as the clutch pawl 16 comes to clutch releasing position at the end of one revolution of the shaft 18 and ultimately said latch pawl 24 is spring-retracted to normal position so as to again engage beneath the tail 22. This latch pawl 24 is provided to prevent rebound of the clutch pawl 16 and holds it in unclutching position. From the drive shaft 18 there are suitable driving connections to the operating parts of the machine.

Card Feed

Figure 1:
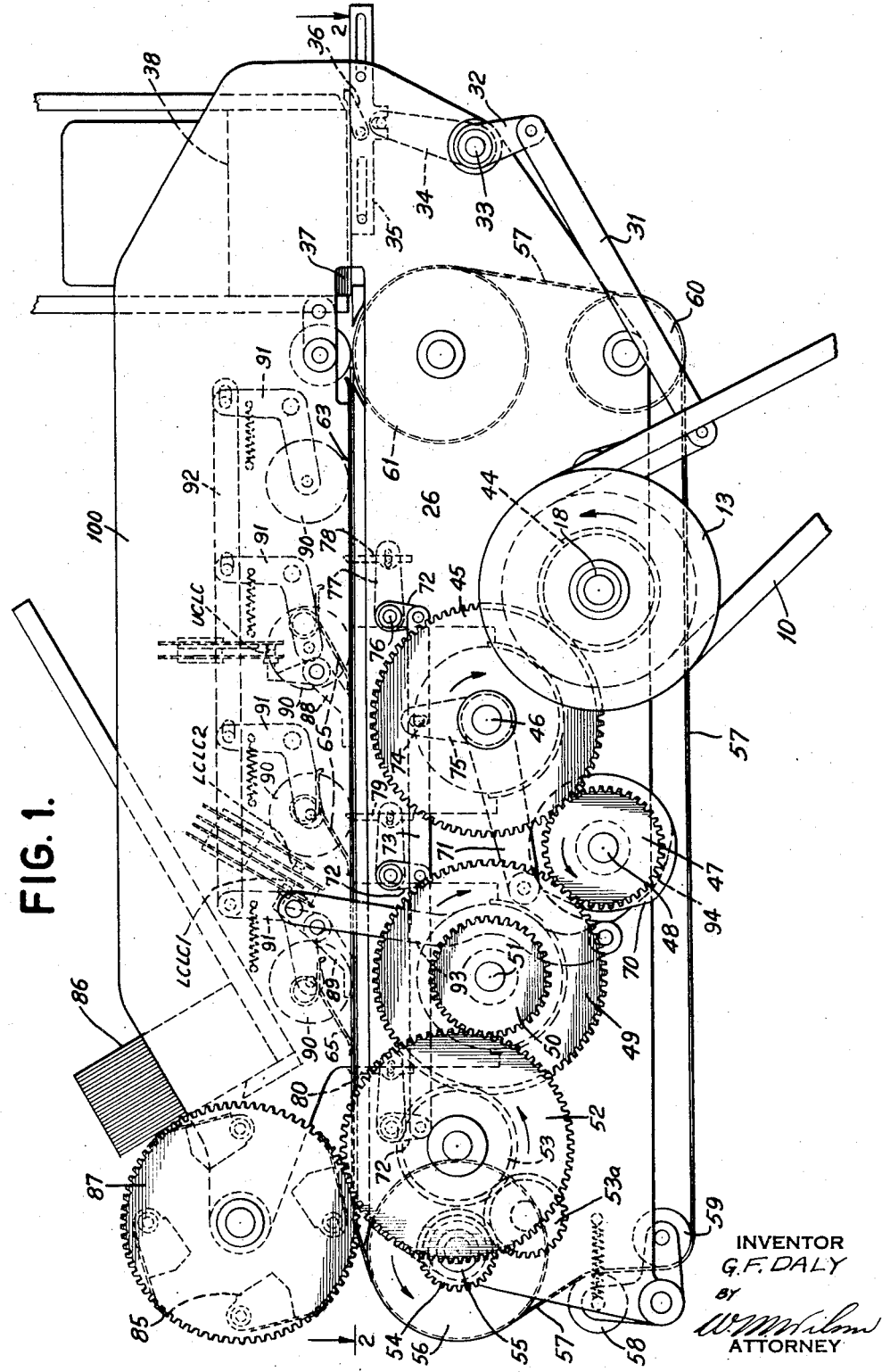
Fig. 1 is a view in side elevation of the card feeding mechanism.
Figure 2:
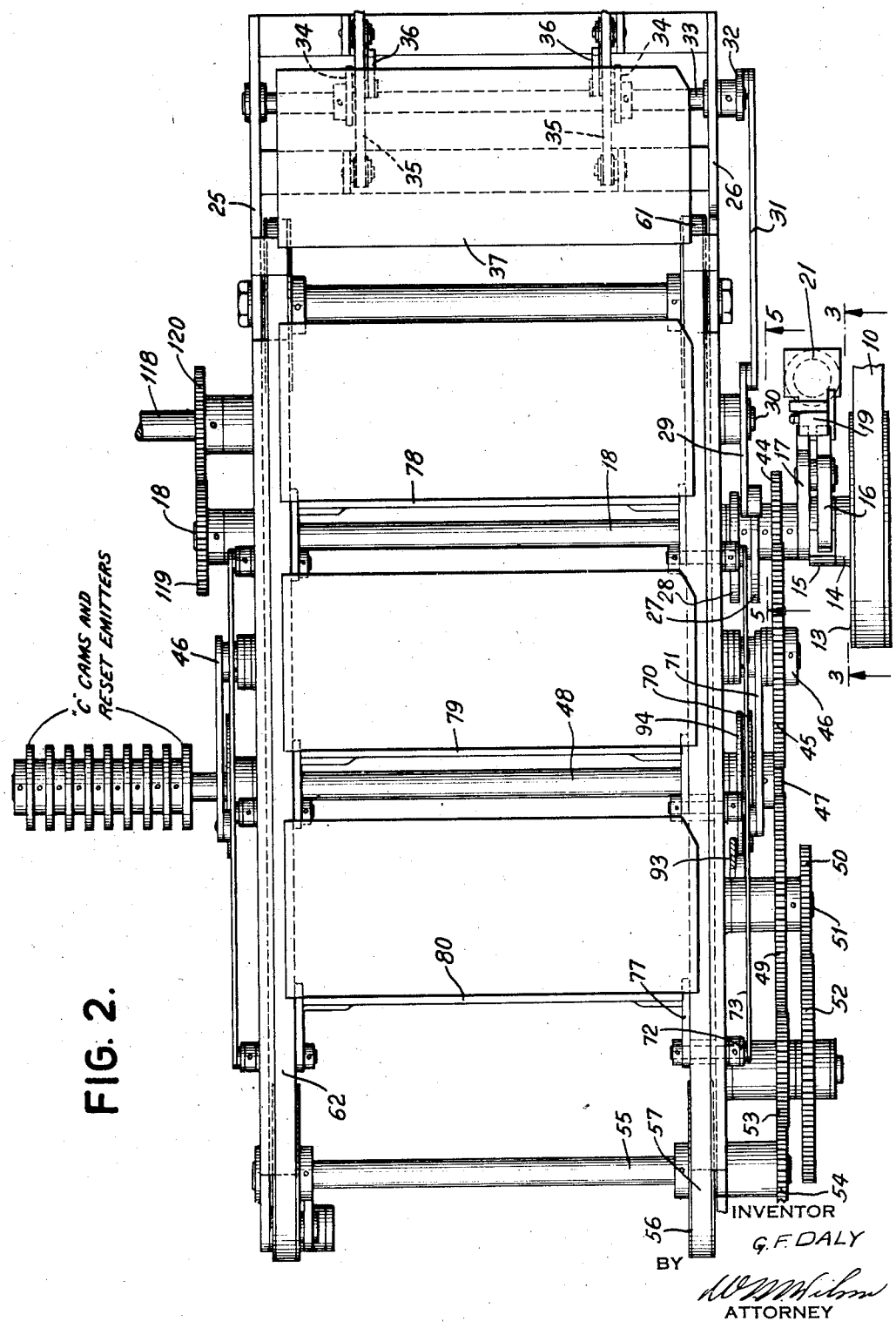
Fig. 2 is a plan view of the card feeding mechanism taken on the line 2—2 of Fig. 1.
Figure 3:
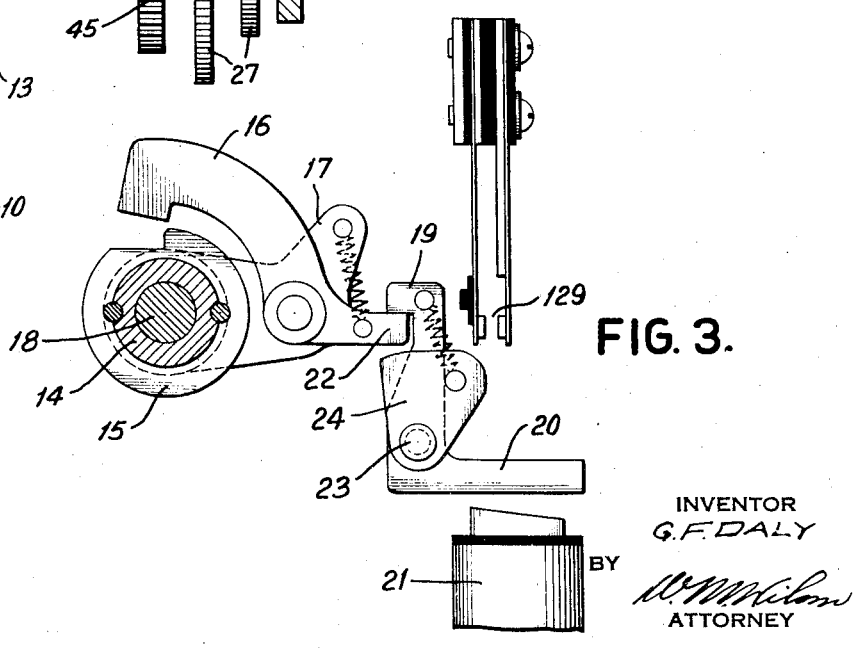
Fig. 3 is a detail view of the card feed clutch taken on the line 3—3 of Fig. 2.

The card feeding mechanism is primarily mounted on side frame plates 25 and 26 (Figs. 1 and 2). Secured to the main drive shaft 18 are complementary cams 27 and 28 best shown in Fig. 5 which complementary cams cooperate with a follower arm 29 pivoted on a stud 30 secured to the side plate 26. Said follower arm has a link connection 31 (Fig. 1) to an arm 32 secured to a rock shaft 33. Upwardly extending from said rock shaft 33 is a pair of arms 34, each having a pin and open slot connection to a related slidably mounted plate 35. Each plate 35 has pivotally mounted thereon a picker 36, said pickers cooperating with the trailing edge of the lowermost card of the supply of cards 37 in a magazine 38. For each engagement of the card feed clutch, the pickers 36 will be reciprocated by the driving mechanism just explained to feed a card out of the magazine to other card feeding devices now to be explained in detail.

The following arrangement is preferably employed for feeding the cards which have been fed out of the supply magazine to the UB and LB analyzing stations.

Referring to Figs. 1 and 2, secured to the drive shaft 18 is a gear 44 meshing with a gear 45 secured to a shaft 46. Said gear 45 meshes with an idler gear 47 secured to a drive shaft 48 and said gear 47 meshes with a gear 49. To the gear 49 there is secured a gear 50 meshing with a gear 52, both gears 49, 50 being secured to a drive shaft 51. Rotatable with gear 52 is a smaller gear 53 meshing through idler gear 53a with gear 54 secured to a drive shaft 55.

To the drive shaft 55 and inside of the side plate 26 there is secured a pulley 56, around which passes one of the endless conveyor belts 57. The path of the conveyor belt 57 is shown in Fig. 1 wherein, it will be seen as it leaves the pulley 56, it passes over tensioning pulleys 58 and 59, then extends to the right as shown in Fig. 1 to partially encircle a pulley 60 on a fixed shaft then over the periphery of another pulley 61 on a fixed shaft. The portion of the conveyor belt between the pulleys 56 and 61 is along a straight line so as to feed the cards in a straight line.

It will also be observed from Fig. 2 that the shaft 55 also drives by a similar arrangement and within the side plate 25 another conveyor belt 62, both conveyor belts 57 and 62 cooperating with the opposite marginal portions of the cards so as to feed them to the UB and LB analyzing stations.

As the card emerges from the supply magazine 38, is passes between the conveyor belts 57, 62 and a related resilient guide plate 63. The edges of the cards are held against the conveyor belts because the plates 63 are held down by torsion springs 65.

As previously stated, gear 45 is secured to shaft 46 and the gear 49 to the shaft 51 and both of these gears, by reason of the selected gear ratios, are rotated 180° each machine cycle. The gear 47 is secured to shaft 48 and by means of the gear ratios selected said shaft is driven one complete revolutions or 360° for each machine cycle and at the same speed as the gear 44 and main drive shaft 18. Said gear 48 has rotatable therewith a cam 70 with which cooperates a follower arm 71 loosely mounted on the shaft 46. Hung by three depending arms 72 which are pivoted on the outside of the side plate 26 is a link 73, said link having a pin and slot connection 74 with an arm 75 secured to the arm 71. Each arm 72 is secured to a rod 76 mounted in the side plate 26, and secured to the rod 76 is a related arm 77 which has a pin and slot connection to a slidably mounted card stop 78 (see also Fig. 4). Through a duplication of the arrangement just described reciprocation of the link 73 is adapted to simultaneously move card stops 79 and 80 out of card stop releasing position at the end of a machine cycle to free the card for feeding by the conveyor belts 57 and 62. From Fig. 2 it will be observed that the rock shaft 48 extends to the other side of the card feed unit and by a duplication of the above described mechanism the other ends of card stops are operated. Hence, card stop 78 provides the first card stop, card stop 79 provides the second card stop and the card stop 80 the third card stop.

The function of such card stops is well known and in the present machine the feeding of a first card from the magazine 38 and subsequent feeding by the conveyor belts 57 and 62 ultimately brings said first card directly against the card stop 78. At the end of the next machine cycle (see Fig. 11), all of the card stops are lowered and card stop 78 releases the card for feeding by said conveyor belts 57 and 62 and thereafter the card stops are again raised and card stop 79 stops the card in analyzing position for coordination of the card perforations with the UB analyzing brushes. In the same manner this card will then be fed to the LB analyzing brushes and held in analyzing position by the card stop 80. As is well known, cards follow each other successively.

When the cards emerge from the LB analyzing station, they are picked up by a stacker device 85 of a conventional construction which is well known in the art. This stacker device is arranged to remove the cards from the conveyor belts 57 and 62 and feed them in stacked position in the storage hopper 86. To drive the stacker device it will be observed that the gear 52 meshes with gear 87, rotatable with the stacker device.

In order to efficiently feed the cards from station to station there is provided a series of gripping rollers 90, each carried by a related spring urged arm 91, and all of said arms are interconnected by a link 92. One of said arms 91 has a follower arm 93 cooperating with a cam 94 secured to drive shaft 48, which has the same contour as cam 70, and, therefore, the same timing. The cam 93 is effective to release arms 91 to press the cards against conveyor belts 57 and 62 to insure feed of the cards thereby. The arrangement shown in Fig. 1 may be duplicated for both sides of the card feeding mechanism.

Incidental devices in the card feeding and sensing unit consist of a card lever 88 which closes UCLC card lever contacts when a card is at the UB sensing station, and a card lever 89 which closes contacts LCLC1 and LCLC2 when a card is at the LB sensing station. The function of such contacts will be subsequently explained in connection with the wiring diagram.

In connection with the card feeding it is explained that the card stops are raised to card stopping position just prior to the completion of the feeding movement of the conveyor belts 57 and 62, thereby enabling the over-movement of the conveyor belts to firmly place the leading edge of each card against the related set of card stops. This will insure the longitudinal alignment of the cards as they are fed.

*Card sensing stations*

The machine includes, as premised hereinbefore, two card sensing stations; the first sensing station UB and the second sensing station LB. The first sensing station is utilized as a control station and the second primarily as an adding and printing control station. However, as is well known, both sensing stations may be utilized for group control. Also, as is well known, the first sensing station UB is also used as a control station to determine whether amounts are to be added under control of the LB brushes or subtracted, which function will be subsequently explained in connection with the wiring diagram.

Figure 7:
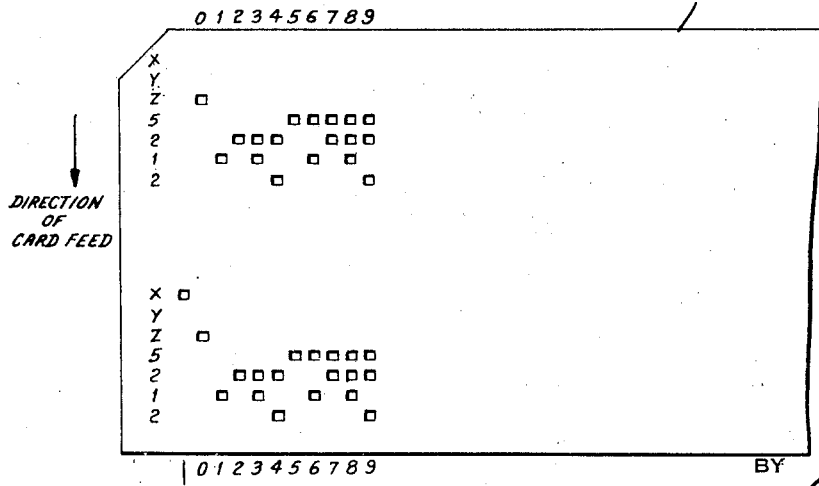
Fig. 7 represents the form of record perforated according to the code adopted herein for the entry notation system.

Each sensing station is adapted to analyze the form of card shown in Fig. 7, wherein it will be seen that the card 37 may be the double deck type and contains in each colum of each deck seven index point positions having the index point representations 2, 1, 2, 5, Z, Y, and X. The numerical values 2, 1, 2, 5 are the assigned digital values of the perforations. The perforations Z, Y, X are used for control or zoning.

The card sensing is effected by coordinated elements known herein as "sensing commutators" and are so called, because while the brushes sense the card perforations commutators are utilized to sense or render effective for control those brushes which have encountered perforations. As a result of this perferred structure the card sensing may be effected while the card is at rest and entries can be initiated by differentially timed impulses derived from the commutator.

The sensing elements comprise for each column a series of four brushes 96 (Fig. 6) which are coordinated with the index points 2, 1, 2, 5 and three sensing brushes 97 coordinated with the X, Y, Z index point positions. The brushes 96 are carried by a metallic block 98 whereas the brushes 97 are carried by a metallic block 99 insulated from the block 98. The seven brushes just described are coordinated with each column of the card and duplicate rows of such brushes are provided for the multiple columns of the card as is obvious from Fig. 4. Any suitable supporting structure may be provided to carry the brushes anl may comprise the side plates 100 (Figs. 1 and 4) of the sensing unit above the card feeding unit. Fig. 6 shows four sets of brushes coordinated with the common column of two cards which are in position for sensing at both the UB and LB stations by the sensing commutators.

Embedded in a block of insulating material 101 (Figs. 4 and 6) and adapted to make contact with the brushes 96—97 through the card perforations is a series of contact elements 102, which latter have wiring connections 103 to contact points 104 of an emitter or sensing commutator. The specific form of wiring connections between the brushes 96, 97 and contact points 104 is also shown in the wiring diagram (Fig. 9).

The sensing commutators for UB and LB are duplicates in structure and comprise for each sensing station a brush carrying member carrying brushes 105 and 106 which, as they rotate, simultaneously contact with the contact points 104 having the same assigned representation. This enables both brushes 105 and 106 to concurrently read the same index point positions in the same column of the upper and lower decks. Current to the brushes 105 and 106 is provided by a common conducting segment 107, against which bear brushes 108 and 109. Brushes 105, 106, 108, 109 are commonly connected and current thereto is via the common segment 107. All the brushes of the sensing commutators for the LB sensing station are driven by the shaft 51, whereas for the UB sensing station shaft 46 drives them. It will be recalled that shafts 46 and 51 are driven 180° for each machine cycle. Therefore, in successive machine cycles brushes 105 and 106 and brushes 108 and 109 alternate in their functions.

Figure 4:
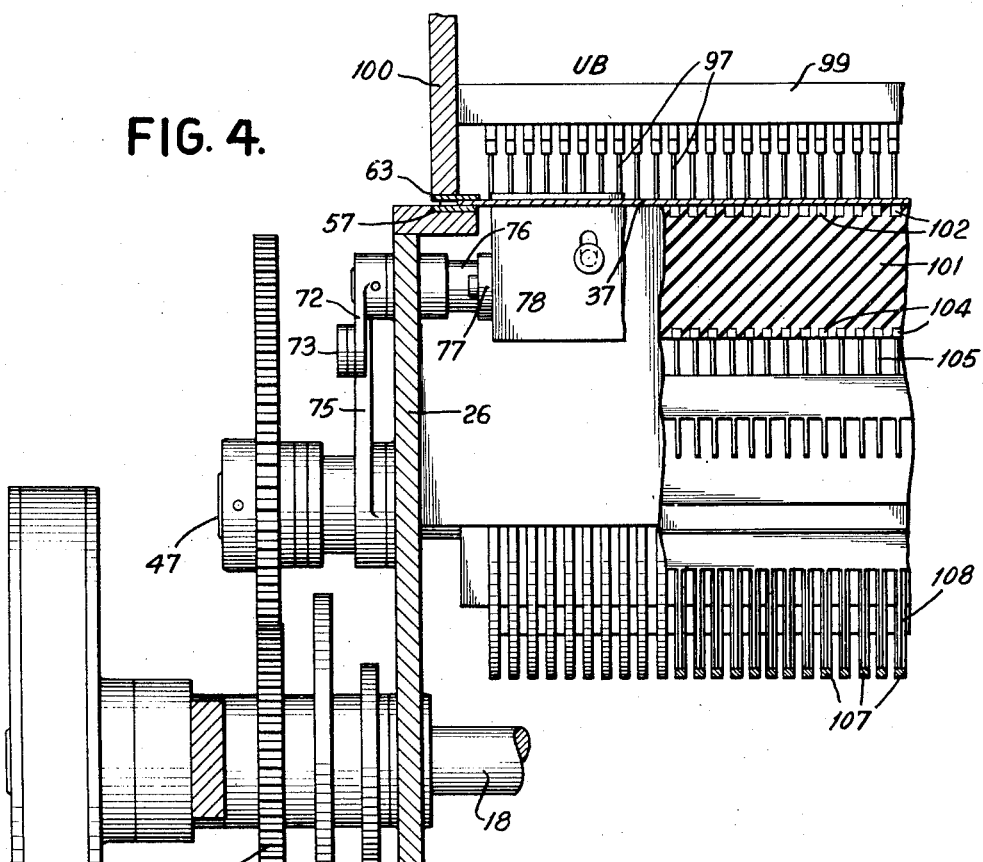
Fig. 4 is a fragmentary sectional view showing particularly the internal construction of the banks of sensing commutators.

It will be observed from Fig. 4 that a sensing commutator is used for each card column and by proper fabrication and mounting each commutator occupies the width of a card column. During a single card sensing cycle both decks of one card are concurrently sensed in each sensing station, and successive cards are sensed concurrently.

Accumulator

It is preferable to utilize the type of accumulator fully shown and described in Patent No. 2,328,653, issued to C. D. Lake et al., granted September 7, 1943.

Figure 8:
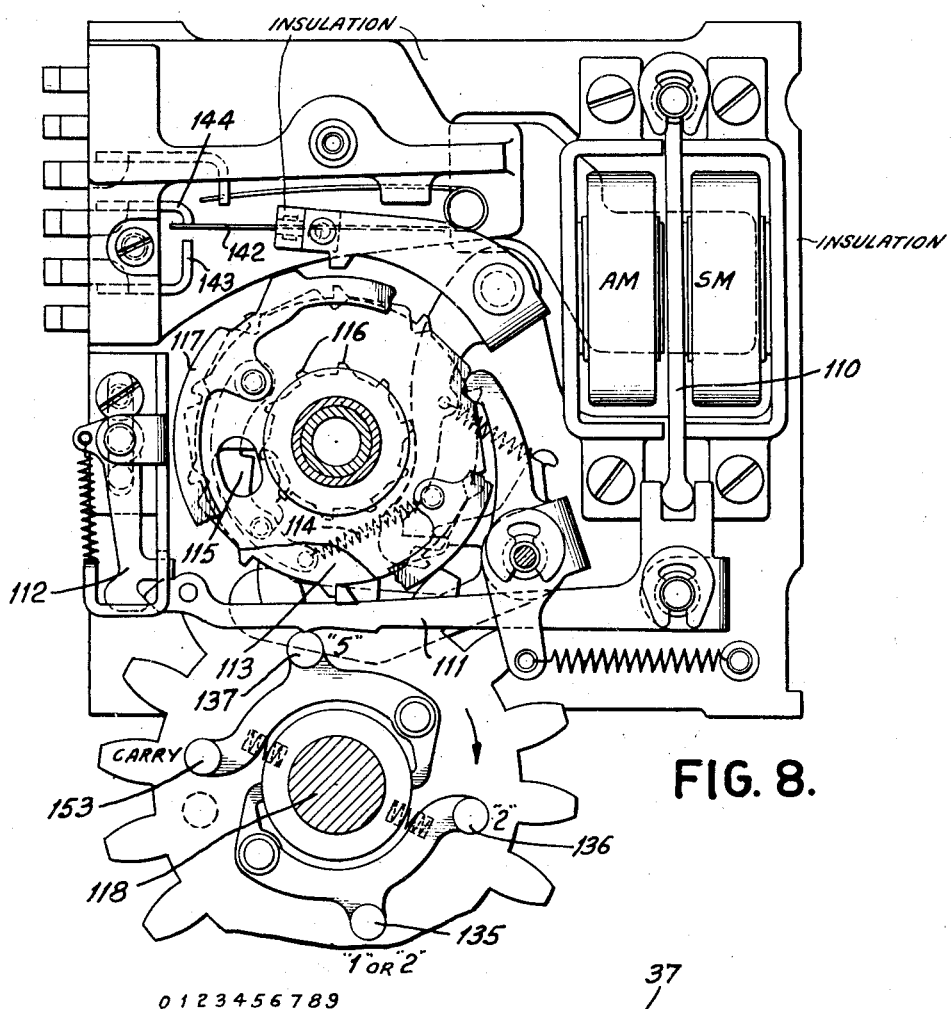
Fig. 8 is a view of an accumulator used herein for accumulating entries.

Fig. 8 shows this accumulator unit which is similar to that in the designated patent but shown herein modified to include necessary changes which will be later explained. Since the detailed construction and operation of this accumulator unit is fully set forth in the patent, a brief description will suffice.

The pivoted armature 110 is normally between the cores of the advance magnet AM and the stop magnet SM and said armature has at its free end a connection to a clutch lever 111. In the declutching position of the clutch lever 111 shown in Fig. 8 the armature 110 is biased against the core of the SM magnet. Whenever the AM magnet is energized the armature 110 will take an alternative position, rocking the clutch lever 111 to a clutching position, the clutch lever 111 being held in either clutching or declutching position by a resilient latch member 112.

A feature of the accumulating unit is that the armature 110 will remain biased by latch member 112 against the AM or SM magnet that last attracted it.

Clutch lever 111 is shown in declutching position and when moved to a clutching position it releases a disk 113 for counterclockwise movement and a spring 114 is now effective to rock clutch pawl 115 into engagement with a constantly rotating ratchet wheel 116. As a result of this clutching operation an accumulator element 117 is initiated in rotation. The termination of the rotation of the accumulator element is effected as a result of the energization of the SM stop magnet in some instances, and in others by knock-out pins 135, 136, 137 and 153. These knock-out pins are shown in Fig. 8 wherein it will be noted that the present accumulator is provided with knock-out pins 153 and 137 which correspond to pins 53 and 52, respectively of the accumulator shown in Patent No. 2,328,653. The present accumulator is modified by the addition of knock-out pins 135 and 136 which function in a manner to be subsequently described. In either case this will rock the clutch lever 111 to declutching position.

The accumulator drive shaft 118 corresponds to shaft 19 of the aforementioned Patent No. 2,328,653. From Fig. 2 it will be observed that a gear 119 carried by the main drive shaft 18 meshes with a gear 120 secured to the aforementioned drive shaft 118. This constitutes in the present machine the driving means for the accumulator wheels and other parts of the accumulator.

Circuit diagram

The operation of the machine will now be described in connection with the wiring diagram of Figs. 9 and 10 and associated timing diagram of Fig. 11. In view of the duplication of control circuits when two cards of Fig. 7, each having two decks, are analyzed by the duplicate analyzing means at UB—LB stations shown in Fig. 6, the wiring diagram of Figs. 9 and 10 shows only the necessary circuits under control of one analyzing means at each station. The sensing commutators are also shown in Figs. 9 and 10 as having only two brushes 106, 108, which are all that are required for the simplified circuits.

The current supply is afforded by lines 125, 126 so that when switch S is closed motor M will be set into continuous operation to rotate pulley 13 through the belt 10.

Card feeding operations are initiated by depression of the start key closing an obvious circuit from line 125, stop key contacts 127, start key contacts 128, card feed clutch magnet 21, to line 126, thus engaging the card feed clutch to feed the lowermost card from the supply magazine 38 to be fed by the conveyor belts. The start key is held depressed to effect successive card feeding cycles until ultimately the first card will be correlated with the LB anaylzing station and a stick circuit for the card feed clutch magnet will be directed through card feed clutch contacts 129, alternately through C3 cam contacts and LCLC2 card lever contacts, through stop key contacts 127 to line 125. By holding the start key down, a point will be reached where successive card feeding operations will be effected automatically when LCLC2 contacts are closed and the machine will continue to automatically feed cards until the card supply is exhausted or until stop key contacts 127 are manually opened. The first card and each successive card will be successively arrested by the card stops 78, 79 and 80 and the cards will feed from station to station under control of such card stops.

*Selective control for subtraction and addition.*—The present invention is capable of effecting entries additively as well as subtractively and the machine is conditioned for a subtracting operation whenever the X upper brush UB of the control column senses a perforation at the X index point position of the card, shown in Fig. 7.

Whenever such X brush encounters said perforation, a circuit will be closed from the line 125, through C12 circuit breaker contacts, through UCLC card lever contacts, closed when a card is at the upper brushes, thence through one of the sensing commutators having the detailed construction shown in Fig. 6 and correlated with the UB analyzing station, common conducting segment 107 thereof, brush 108, to brush 106. The cam contacts C12 and other "C" contacts are driven by cams secured to shaft 48 (Fig. 2) and are operated synchronously with the rotation of the sensing commutator brushes, and when cam contacts C12 close at the X index point positions brush 106 will make contact with the segment 104 designated X and the circuit will then extend by a wire 103X and contact element 102X to the X sensing brush 97, support block 99, plug connection 131, cam contacts C7, pickup coil of the R3 relay, to line 126. Cam contacts C7 are timed to close with the closure of the C12 contacts at the X time (Fig. 11), at which time the sensing commutator at the X position will complete a circuit to the R3 relay. R3 relay will then close its contacts R3a and a circuit will be closed for the hold coil of the R3 relay, extending through contacts R3a, cam contacts C8 to line 125. Prior to the opening of C8 cam contacts, cam contacts C9 will close, completing a circuit from the line 125, through cam contacts C9, R3b relay contacts now closed, subtracting control relay SR to line 126. SR relay closes its SRa contacts, providing a stick circuit for the subtracting control relay SR extending through such contacts and cam contacts C10 to line 125. Contacts C10 retain the subtracting control relay energized during the portion of the next cycle (Fig. 11) in which complement entries are effected, either singly or in combination to enter a tens complement of the natural numbers to be subtracted. The manner in which subtracting operations are effected will be subsequently described. However, it will be observed that the SR relay remains unenergized when adding operations are to be effected under control of the card analyzed by the LB brushes. It is further explained that the selection of the X index point position for subtracting is merely exemplary and by suitably timing cam contacts C7, or by the other differently timed contacts, other index point positions may be utilized.

Zone impulses are derived from the card when analyzing the index point positions designated Z, Y, & and X, and are transmitted by the circuit breaker C12 and the sensing commutator at such positions.

As is well known in the type of machine now being described, entry operations are effected under control of perforations when the card is sensed by the LB brushes and herein entries are made for four denominational orders, by way of example. The entry circuit in part extends from line 125, through circuit breaker contacts C12, lower card lever contacts LCLC#1; to the common segment 107 of the sensing commutator for each denominational order.

*Additive entries.*—The entry code for the digits comprises 2, 1, 2, 5 and these digits are entered singly or in combination, according to the holes analyzed by the corresponding sensing brushes 96. Each sensing brush 96 for each digit position coacts with a contact element 102 through the perforation in the card. Wire connections 103 are established from contact elements 102 to contact points 104 of the sensing commutator and the contact points 104 are spaced so as to initiate differentially timed digit impulses, which impulses are concurrent with the add impulses transmitted by the circuit breaker C12. Hence, it is apparent that the sensing of the card holes does not initiate the digit impulses but that the sensing brushes through the perforations determine which contact points 104 of the commutator are to be effective for transmitting differentially timed digit impulses. As will be evident later, add impulses directed by the circuit breaker contacts C12 and by the sensing commutator are timed with the operation of the knock-off pins of the accumulator to effect the desired digit entries.

Assuming that a perforation has been encountered in a card column, the entry circuit for each order continues from the common conducting segment 107, through the brushes 108, 106 of the sensing commutator, a contact point 104 and related wire connection 103 associated with the contact element 102 which is engaged by the sensing brush 96 passing through a perforation, plug connection 133, SR1 normally closed contacts, normally closed CR contacts, RR relay contacts now normal, to the advance magnet AM, to line 126.

*Entry of digit 2.*—For a digit entry 2 when a hole is at the lowermost index point position, the sensing commutator times the transmission of the digit impulse coincident with the impulse transmitted by the C12 circuit breaker at the "a" point in the cycle (see Fig. 11), thus energizing the advance magnet AM and the accumulator element remains clutched until it is rotated to the extent of two clutch teeth. At this time, the knock-off pin 135 (Fig. 8) is effective to declutch the accumulator element in a well known manner.

*Entry of digit 1.*—For the entry of the digit 1 the sensing commutator transmits a differentially timed impulse to the advance magnet AM at a time which is coincident with the impulse transmitted by the circuit breaker C12 at the "b" point in the cycle (see Fig. 11). Thereafter, the knock-off pin 135 will be effective to declutch the accumulator element. Thus, for the entry of the digit 1 the accumulator entry period is shortened to effect the 1 digit entry.

*Entry of digit 2.*—To effect the 2 digit entry when a perforation is at the third index point position from the bottom, the sensing commutator will transmit a differentially timed impulse to the advance magnet AM at a time coincident with the add impulse transmitted by C12 circuit breaker at the "d" time in the cycle (see Fig. 11). This will clutch the accumulator element to receive a 2 digit entry, which entry is terminated by the knock-off pin 136 (Fig. 8).

*Entry of digit 5.*—Whenever a perforation is at the 5 index point position, the sensing commutator will transmit a differentially timed impulse to the advance magnet AM, coincident with the impulse transmitted by the circuit breaker C12 at the "g" time in the cycle, enabling the accumulator element to rotate to an extent to effect the entry of the digit 5. The declutching of the accumulator element is performed by the knock-off pin 137 (see Fig. 8).

The preceding description has described the operation of the machine for the entry of the basic digits singly in the preferred code 2, 1, 2, 5. From this code it is evident that the remaining digits 3, 4, 6, 7, 8 and 9 are entered by a combination of the basic digits according to the following table:

| Digit entry | Combination of digit entries |
|---|---|
| 3 | 2, 1 |
| 4 | 2, 2 |
| 6 | 5, 1 |
| 7 | 5, 2 |
| 8 | 5, 2, 1 |
| 9 | 5, 2, 2 |

It is thought unnecessary to give further description of the manner of operation of the machine for the successive entry of combination of digits to enter 3, 4, 6–9 since this is carried out precisely in the manner as for the entry of each digit singly.

Subtraction

The SR relay which is energized to condition the machine for subtraction transfers its multiple contacts SR1 and closes the SR2 contacts in all denominational orders. The transfer of the SR1 contacts in each denominational order co-ordinates the C13 cam contacts (Fig. 9) with the advance magnets of all denominational orders so that at "a," "d" and "g" times in the cycle (Fig. 11) impulses directed by the C13 cam contacts will energize the advance magnet AM of each order to initiate digit entries 2, 2 and 5 in succession. The circuit is from line 125, through C12 circuit breaker contacts, LCLC1 card lever contacts, wire 138, C13 cam contacts, wire 139, thence through the transferred SR1 contacts of each denominational order, the CR contacts now normal, the RR contacts now normal, to advance magnet AM, to line 126. Thus, C13 cam contacts transmit differentially timed impulses to potentially enter the digits 2, 2, 5 in succession and the knock-off pins 135, 136, 137 are effective to terminate such entries. The summation of the digit entries 2, 2, 5 will enter a 9 digit in each denominational order that the corresponding column is imperforate. The presence of a hole in the card column will, in accordance with the digit represented thereby, cancel or nullify the corresponding digit entry in a manner now to be described. The principle of operation may be expressed by the following table:

| Digit expressed in card column | Normal successive entries | Holes at | Nines complement entry |
|---|---|---|---|
| 1 | 2, 2, 5 | 1 | 1, 2, 5=8 |
| 2 | 2, 2, 5 | 2 | 2, 5=7 |
| 3 | 2, 2, 5 | 1, 2 | 1, 5=6 |
| 4 | 2, 2, 5 | 2, 2 | 5 |
| 5 | 2, 2, 5 | 5 | 2, 2=4 |
| 6 | 2, 2, 5 | 1, 5 | 2, 1=3 |
| 7 | 2, 2, 5 | 2, 5 | 2 |
| 8 | 2, 2, 5 | 1, 2, 5 | 1 |
| 9 | 2, 2, 5 | 2, 2, 5 | 0 |

For the entry of the complement of certain digits expressed in the card columns, such as the digits 1, 3, 6 and 8, the first normal 2 digit entries is shortened to a 1 digit entry, because the presence of a hole at the 1 index point position terminates the accumulator operation after a 1 digit entry. In this operation the C13 cam contacts transmit an impulse at "a" time in the cycle (Fig. 11) to the advance magnet AM to initiate a 2 entry. Armature 110 will now be attracted by the core of the AM magnet. At the time that the 1 hole is analyzed, an impulse is directed by the sensing commutator when the brush contacts the 1 segment, the circuit extending from such commutator, through the sensing brush 96 at the 1 index point position, plug connection 133, SR2 contacts now closed, stop magnet SM to line 126. Energization of the stop magnet SM will now attract the armature 110 to declutch the accumulator element. Thus, whenever a 1 is to be entered in a complement digit entry, the first normal 2 entry is shortened to result in the 1 digit entry.

For other complement digit entries, either the first or second or both 2 digit entries are cancelled or nullified. For example, in entering the complement of the digits 4 and 9, both 2 digit entries are cancelled.

From Fig. 11 it will be seen that cam contacts C13 normally transmit impulses at "a" and "d" times to the AM magnet to provide for both 2 digit entries. If, at the time either of such impulses are transmitted, the sensing commutator transmits an impulse to the SM magnet, the AM and SM magnets will be concurrently energized and no digit entry will be effected. A transmission of a digit impulse to the stop magnet SM concurrently with the AM advance magnet will not result in the clutching of an accumulator element. The reason for this is that the force of attraction exerted by the SM magnet on armature 110 will be greater than that exercised by the AM magnet, because of the normal airgap between the armature 110 and the core of the AM magnet. Thus, for the entry of the complement of certain digits, both 2 digit entries will be cancelled.

For the complement entry of other digits, only one 2 digit entry is cancelled in the same manner and the other will be entered. This will be observed from the table in the entry of the complement of the digits 2 and 7.

In the complement entry of the digits 3 and 8 this is the case where one of the 2 digit entries is cancelled and the other 2 digit entry is shortened to a 1 digit entry.

Cancellation of the 5 digit entry is effected by the same mode of operation, that is to say, the normal digit entry effected by the C13 cam contacts is cancelled or nullified by the differentially timed impulse transmitted by the sensing commutator upon sensing a hole at the 5 index point position. Of course, in the absence of a hole the normal 5 entry will be effected. Cancellation of the 5 digit entry takes place in entering the complements of the digits 5, 6, 7, 8 and 9, whereas the normal 5 digit entry takes place in entering the complement of the digits 1–4. It may also be stated that whenever 9 is expressed in a card column by holes at the 2, 2, 5 index point positions, all these normal digit entries are cancelled and there will be no operation of the accumulator element.

Units carry control circuit

The accumulator of the type shown herein is also provided with a units carry control mechanism associated with a units carry circuit herein which is of conventional arrangement. For this reason, such circuit will be described generally.

Considering now the units order accumulator wheel, when the latter passes from 9 to 0, the carry contact blade 142 (see Fig. 8) will be shifted and latched to engage the "10" carry contact 144. At about 270° (see Fig. 11), cam contacts C6 close to energize, by an obvious circuit (Fig. 9), the CR carry control relay, which latter transfers its $u$, $t$, $h$ contacts. Thereafter, contacts C11 close, closing the circuit from the line 125 through cam contacts C11, through the aforementioned "10" units carry contact 144, contact blade 142 of the units order, thence through the CR$t$ contacts now transferred, through the RR$t$ contacts now in normal position, to the AM magnet of the tens order, causing the clutching of the accumulator element to effect a units carry to the tens order.

As fully shown in the patent to C. D. Lake, et al., No. 2,328,653, a knock-off pin 153 (Fig. 8) (53 in said patent) serves, at the end of a cyclical carry, to cause the accumulator wheel to be arrested after a unit carry entry.

The so-called "nines" preparatory carry circuit is also provided in the type of accumulating unit shown herein and considering now the tens order, if the related accumulator wheel is standing at 9 the "9" units carry control contact 143 will be engaged by the related contact blade 142 and the units carry impulse will be extended from the "10" units carry control contact 144 and blade 142 of the units order, thence through the "9" units carry control contact 143 of the tens order, related contact blade 142, thence through the CR$h$ contacts now transferred, the RR$h$ contacts now in normal position to the AM magnet of the hundreds order. In the customary manner this will effect the units carry to the hundreds order.

Since subtraction is effected herein by the complemental process by the entry of the "nines" complement of the amount to be subtracted, it is customary to effect, at times, the entry of a fugitive unit when the highest order wheel goes from 9–0. Carry mechanism of a selected order is employed as an instrumentality to effect this fugitive unit entry.

Referring to Fig. 10 it will be seen that a plug connection 146 is made to contact blade 142 of the highest denominational order or the thousands order herein. Whenever the accumulator element of such order goes from 9 to 0, the contact blade 142 will make contact with the contact 144 and the unit carry impulse will be directed through such contact 144 and contact blade 142, plug connection 146 (see Fig. 9) thence through the CR$u$ contacts now transferred, RR$u$ contacts now normal to the AM magnet of the units order. This will effect a units carry to the units order.

Accumulator reset

It is preferable to provide means to reset the accumulator when entries have been effected under control of a series of records. Ordinarily, in a record controlled accounting machine such reset would be performed at the termination of entries under control of a series of similarly classified records. It would provide for stopping card feed during such reset operations. However, to simplify the disclosure it will be assumed that reset operations are to be effected after a series of records in the magazine have passed through the machine, enabling resetting operations to be effected manually.

The depression of the reset key will close contacts 147 (Fig. 9) and through an obvious circuit will energize the card feed clutch magnet 21. The reset key will be depressed long enough to initiate the engagement of the card feed clutch and all of the mechanism will operate but no cards will be fed because a reset operation will be initiated only after cards have been exhausted. The closure of contacts 148 by the reset key closes a circuit from the line 125 through such contacts to the RR relay and RRR relay to line 126, the stick circuit for the latter being effected through the RR1 contacts and cam contacts C15 back to line 125. Cam contacts C15 will retain the RR, RRR relays energized during the portion of the reset cycle when impulses are to be transmitted under control of a reset commutator 152. The RR relay will transfer its contacts $u$, $t$, $h$, $th$, related to the advance magnets AM of all denominational orders. RRR relay will close its contacts 1–9 to select reset emitter 152 for operation, and the coordinated wiring will now be explained in detail. The RR relay will open the RR2 contacts to prevent the energization of the carry relay CR so that the carry circuits will not function during the reset cycle.

Each accumulator wheel has a related commutator type readout device and since the detailed construction is well known, each readout device 150 is only shown diagrammatically in Figs. 9 and 10. The readout commutator comprises a brush positionable according to the digit positions of the accumulator wheel to make contact with digit segments connected to a series of digit lines 151. The digit lines 151 are wired to a reset emitter 152 in the manner shown in Fig. 10 and which is wired to the digit lines 151 to transmit thereto through the RRR relay contacts one or more reset impulses having a value 2, 1, 2, 5 and which are selected according to the digit position of the readout device to reset the accumulator wheel to zero. The reset emitter is driven by shaft 48 (Fig. 2) so that impulses are transmitted at "$a$," "$b$," "$d$" and "$g$" times in the reset cycle (Fig. 11) to effect the clutch engagement which in conjunction with the knock-off pins 135, 136, 137 will move the wheel two digit positions; one digit position; two digit positions and five digit positions, respectively.

The impulses from the aforesaid reset emitter 152 are used according to the following table:

| Wheel at | Reset entry | Successive digit impulses selected |
|---|---|---|
| 1 | 9 | 2, 2, 5 |
| 2 | 8 | 1, 2, 5 |
| 3 | 7 | 2, 5 |
| 4 | 6 | 1, 5 |
| 5 | 5 | 5 |
| 6 | 4 | 2, 2 |
| 7 | 3 | 1, 2 |
| 8 | 2 | 2 |
| 9 | 1 | 1 |

If, for example, a wheel of any order should be standing at the 1 digit position the readout will be at the same position and the reset emitter 152 will then close a circuit from the line 125 through reset contacts 148 (Fig. 9), wire 153 to the brush of the reset emitter to the 2 contact point contacted at the "a" impulse time, through the RRR1 relay contact, thence to the 1 digit line of the group 151 through the readout 150, wire 154, through the RR contacts now transferred, to the AM advance magnet. The accumulator wheel and the related readout device will be rotated two steps to bring both to the 3 digit position. The reset emitter again makes contact at the "d" time with the second 2 contact point and thus a second impulse will be selected and transmitted under control of the readout device to the AM advance magnet. The accumulator wheel and readout device will now go to the 5 digit position and at the "g" impulse time the reset emitter will transmit an impulse to the 5 digit line of the group 151, thence through the readout 150 to the advance magnet AM, and the accumulator wheel and readout will turn five steps to bring them both to the 0 position.

If the accumulator wheel had been standing at 2, the reset emitter would transmit the first impulse at the "b" time in the reset cycle so as to turn the accumulator wheel and related readout one step to the 3 digit position. At such position and at the "d" time in the impulse cycle, the reset emitter will transmit the second impulse to the AM advance magnet and the wheel will now go to the 5 digit position. Under control of the readout at such digit position the reset emitter will direct a third impulse to the AM advance magnet to bring the wheel and readout to 0.

Obviously, from the above table it is evident that if the wheel had been standing at 3 the reset emitter will transmit only two digit impulses, having the value 2, 5 which will effect a 7 digit entry in the accumulator wheel and related readout to bring them to 0.

If the wheel had been standing at 4, it will be noted that with the readout at the 4 digit position a 1 digit impulse will be transmitted by the reset emitter to bring the wheel to 5. At the 5 digit position the reset emitter is now effective to transmit a 5 digit impulse to bring the wheel to 0.

It is thought that resetting of the accumulator wheel from other digit positions 5-9 to 0 will be evident from the above table which can be followed in connection with the timing shown in Fig. 11 and the specific wiring connection shown in Fig. 10.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine controlled by records perforated to represent digits 2, 1, 2 or 5, singly or in combination, an accumulator element, means including a magnet to effect the advance of said element, four perforation sensing means, each for sensing perforations representing digits 2, 1, 2, 5, an impulse emitter having a rotatable brush successively engageable with four contact points wired to the related perforation sensing means, the first and second contact points contacted by the brush at differential times to transmit a 2 or 1 digit impulse to said magnet depending upon the 2 or 1 digit perforation sensed, the third contact point so spaced apart from the second contact as to provide sufficient time to cause the termination of a 1 or 2 digit entry and then be contacted by said brush to transmit an impulse to initiate a 2 digit entry if the second 2 digit perforation is sensed, and the fourth contact point so spaced from the third contact point as to provide sufficient time to cause the termination of the second 2 digit entry and then be contacted by said brush to transmit an impulse to initiate a 5 digit entry if the 5 digit perforation is sensed, circuit connections from said sensing means to said magnet, and means operable at a plurality of times to terminate the advance of said accumulator element upon effecting either the 1 or 2 digit entry, the second 2 digit entry or the 5 digit entry.

2. In a machine controlled by records perforated to represent digits 2, 1, and A or B digits, singly or in combination, an accumulator element, means including a magnet to effect the advance of said element, four perforation sensing means, each for sensing perforations representing digits 2, 1, A or B digits, an impulse emitter having a rotatable brush successively engageable with four contact points wired to the related perforation sensing means, the first and second contact points contacted by the brush to transmit a 2 or 1 digit impulse to said magnet depending upon the 2 or 1 digit perforation sensed, the third contact point so spaced apart from the second contact as to provide sufficient time to cause the termination of a 1 or 2 digit entry and then be contacted by said brush to transmit an impulse to initiate an A digit entry if the A digit perforation is sensed, and the fourth contact point so spaced from the third contact point as to provide sufficient time to cause the termination of the A digit entry and then be contacted by said brush to transmit an impulse to initiate a B digit entry if the B digit perforation is sensed, circuit connections from said sensing means to said magnet, and means operable at a plurality of times to terminate the advance of said accumulator element upon effecting either the 1 or 2 digit entry, the A digit entry or the B digit entry.

3. In a machine controlled by records perforated to represent four digits which singly or in combination represent digits 1-9 of the decimal system, an accumulator element, means including a magnet to effect the advance of said element, means to terminate the advance of said element, four perforation sensing means, each for sensing the related digit representing perforation, an impulse emitter comprising a rotatable brush contacting in succession four contact points individually wired to the four sensing means, each of the four contact points being so spaced about the brush contacting surface that when contacted by the rotatable brush to close a circuit through the related sensing means, said emitter will transmit an impulse to said magnet to initiate a digit entry corresponding to the digital value represented by the perforation sensed, and pairs of said contact points related to successive entries being so spaced apart as to provide sufficient time to terminate the digit entry initiated by the first contacted contact point prior to the time that the brush contacts the next contact point, circuit connections from said sensing means to said magnet, and means operable at a plurality of times during the rotation of said brush to cause the operation of the terminating means to terminate the advance of said element for each of the digit entries effected.

4. Resetting means for resetting an accumulator element to a zero digit position by a maximum of four electrical impulses utilized singly or in combination to initiate the advance or readvance of said accumulator element comprising digit representing devices positionable by said element, advancing means for said element, means to terminate the advance of said element, impulse emitting means for sequentially transmitting digit impulses of values 2, 1, 2, 5, circuit connections from said emitting means to said advancing means completed by said devices when at initial digit positions 1 or 6 to transmit the first 2 digit impulse to said advancing means to advance said element two steps, further circuit connections from said emitting means to said advancing means completed by said devices when at initial digit positions 2, 4, 7 or 9 to transmit a 1 digit impulse to said advancing means to advance said element one step, means to operate said terminating means to terminate either of the aforesaid 2 or 1 step advancing operations, other circuit connections from said emitting means to said advancing means completed by said devices when at digit positions 3 or 8, either initial or readvanced, to transmit the second 2 digit impulse to said advancing means to advance said element two steps, means for operating said terminating means to terminate said 2-step advancing operation, still further circuit connections from said emitting means to said advancing means completed by said devices when at digit position 5, either initial or readvanced, to transmit the 5 digit impulse to said advancing means to advance said element five steps, and means for operating said terminating means to terminate said 5-step advancing operation.

GEORGE F. DALY.

REFERENCES CITED

The following references are of record in the file of this patent:

UNITED STATES PATENTS

| Number | Name | Date |
| --- | --- | --- |
| 2,106,801 | Houston | Feb. 1, 1938 |
| 2,244,241 | Bryce | June 3, 1941 |
| 2,343,370 | Dickinson | Mar. 7, 1944 |
| 2,348,535 | Goodale | May 9, 1944 |
| 2,386,425 | Brand | Oct. 9, 1945 |
| 2,399,755 | Mills et al. | May 7, 1946 |

FOREIGN PATENTS

| Number | Country | Date |
| --- | --- | --- |
| 516,807 | Germany | Feb. 5, 1931 |